(12) United States Patent
May (10) Patent No.: US 7,118,228 B2
(45) Date of Patent: Oct. 10, 2006

(54) IMAGE DISPLAY SYSTEM

(75) Inventor: Gregory J. May, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/701,766

(22) Filed: Nov. 4, 2003

(65) Prior Publication Data

US 2005/0094111 A1    May 5, 2005

(51) Int. Cl.
*G03B 21/28* (2006.01)
*G03B 21/14* (2006.01)
*G03B 21/26* (2006.01)
*G03B 37/00* (2006.01)
*G03B 21/56* (2006.01)

(52) U.S. Cl. .......................... 353/99; 353/30; 353/37; 353/69; 353/94; 353/122; 359/449; 359/460; 359/834; 348/36; 348/38; 348/840; 352/69

(58) Field of Classification Search ................. 353/37, 353/71, 79, 94, 99, 122, 30, 69; 359/449, 359/460, 629, 636, 638, 834, 626; 348/36, 348/38, 840; 352/69
See application file for complete search history.

(56) References Cited

U.S. PATENT DOCUMENTS

| | | | |
|---|---|---|---|
| 3,107,577 A | 10/1963 | Adams | 88/16.6 |
| 4,357,081 A | 11/1982 | Moddemeijer | 352/69 |
| 4,395,093 A | 7/1983 | Rosendahl et al. | 350/441 |
| 4,566,763 A | 1/1986 | Greguss | 350/441 |
| 4,991,955 A | 2/1991 | Vetter | 352/69 |
| 5,130,794 A | 7/1992 | Ritchey | 358/87 |
| 5,264,881 A | 11/1993 | Brooke | 353/94 |
| 5,539,483 A | 7/1996 | Nalwa | 353/94 |
| 5,563,650 A | 10/1996 | Poelstra | 348/36 |
| 5,627,675 A | 5/1997 | Davis et al. | 359/366 |
| 5,920,337 A | 7/1999 | Glassman et al. | 348/36 |
| 6,002,430 A | 12/1999 | McCall et al. | 348/207 |
| 6,043,837 A | 3/2000 | Driscoll, Jr. et al. | 348/36 |
| 6,118,474 A | 9/2000 | Nayar | 348/36 |
| 6,141,034 A | 10/2000 | McCutchen | 348/36 |
| 6,152,739 A | 11/2000 | Amery et al. | 434/38 |
| 6,157,018 A | 12/2000 | Ishiguro et al. | 250/208.1 |
| 6,337,708 B1 | 1/2002 | Furlan et al. | 348/36 |
| 6,341,044 B1 | 1/2002 | Driscoll, Jr. et al. | 359/725 |
| 6,356,297 B1 | 3/2002 | Cheng et al. | 348/36 |
| 6,409,351 B1* | 6/2002 | Ligon | 353/98 |
| 6,480,229 B1 | 11/2002 | Driscoll, Jr. et al. | 348/335 |
| 6,525,725 B1* | 2/2003 | Deering | 345/419 |
| 6,563,529 B1 | 5/2003 | Jongerius | 348/36 |
| 6,644,816 B1* | 11/2003 | Perra et al. | 353/119 |
| 6,802,614 B1* | 10/2004 | Haldiman | 353/69 |
| 6,809,887 B1* | 10/2004 | Gao et al. | 359/725 |
| 6,939,025 B1* | 9/2005 | Chang | 362/299 |
| 6,941,026 B1* | 9/2005 | Nadabar et al. | 382/265 |
| 2001/0056574 A1 | 12/2001 | Richards | 725/36 |
| 2002/0149752 A1* | 10/2002 | Courchesne | 353/122 |
| 2003/0068068 A1 | 4/2003 | Rondineli et al. | 382/276 |
| 2003/0095338 A1 | 5/2003 | Singh et al. | 359/725 |

FOREIGN PATENT DOCUMENTS

DE    195 00 693 A1 *  7/1996
JP    410142553 A      5/1998

* cited by examiner

*Primary Examiner*—Melissa Jan Koval (57) ABSTRACT

A display system includes a single image-projection device, and a reflective surface optically coupled to the image-projection device, wherein the reflective surface is configured to reflect a plurality of images projected by the image-projection device onto a plurality of display surfaces, the projection being along a same path as a collection of the plurality of images.

60 Claims, 10 Drawing Sheets

IMAGE DISPLAY SYSTEM

BACKGROUND

With today's digital technology, it is increasingly easier to capture and record high quality images. Digital cameras, camcorders, and other similar devices provide users with the ability to digitally capture and record a scene or a moment in time. Often, pictures and videos representing digitally captured and recorded scenes are presented on a screen or other flat surface using some type of projection device.

Image-projection devices such as liquid crystal display (LCD) projectors, digital light processing (DLP) projectors, film projectors, slide projectors, overhead projectors, etc. are used to project an image onto a surface. Typically, the receiving surface of a projected image is a wall or a screen. Projectors are commonly used to project images in a variety of places and applications. For example, projectors may be used in movie theaters, home theaters, classrooms, outdoor displays, conference rooms, or in other situations where one may desire to display an image.

Traditionally, image-projection devices have been used to project images onto a single flat or slightly curved surface. While this display method allows for multiple users to simultaneously view a two-dimensional image, an immersive environment is difficult to produce.

SUMMARY

A display system includes a single image-projection device, and a reflective surface optically coupled to the image-projection device, wherein the reflective surface is configured to reflect a plurality of images projected by the image-projection device onto a plurality of display surfaces, the projection being along a same path as a collection of the plurality of images.

BRIEF DESCRIPTION OF THE DRAWINGS

The accompanying drawings illustrate various exemplary embodiments of the present system and method and are a part of the specification. The illustrated embodiments are merely examples of the present system and method and do not limit the scope thereof.

Throughout the drawings, identical reference numbers designate similar, but not necessarily identical, elements.

DETAILED DESCRIPTION

In a number of situations, it may be desirable to project images, often combined with sound, to create an immersive environment where the user feels completely surrounded by, and a part of the surroundings. In order to completely immerse the user in the new environment, one or more images may be projected onto the surfaces surrounding the user. For example, if the user is in a room with four walls, the image or images would be projected onto each of the four walls. Traditional methods for projecting images on multiple walls are cost prohibitive due to the need for multiple projectors, specially designed surfaces, and required pre-morphing software.

The present specification describes a method and apparatus for projecting an image or a motion picture onto multiple surfaces using a single image-projecting device. According to one exemplary embodiment, the present system and method avoids the aforementioned issues associated with multiple projector systems by incorporating a 360-degree projection system using a single image-projecting device and a specialized mirror. The specialized mirror is configured to project images onto multiple surfaces along a same optical path as a collection of the plurality of images, thereby eliminating the need for morphing the images.

In the present specification and in the appended claims, the term "image-projecting device" or "projectors" is meant to be understood broadly as any device configured to receive an image or data representing an image and to reproduce an image based on the received content. Typical image-projecting devices or projectors may include but are in no way limited to, liquid crystal display (LCD) projectors, digital light projectors (DLP), liquid crystal on silicon (LCOS) projectors, cathode ray tube (CRT) projectors, film projectors, slide projectors, overhead projectors, light emitting diode (LED) projectors, vertical cavity emitting laser (VCEL) projectors, and the like. Similarly, the term "image" is meant to be understood broadly as meaning any still picture, motion picture, recorded film picture, real-time video feed, television broadcast picture, and the like. Moreover, the term "mirror" is meant to be understood broadly as any shape or material sufficiently reflective to reflect and reproduce a projected image. Additionally, the term "prismatic" or "prism" may refer to a polyhedron with two congruent and parallel faces (the bases) and whose lateral faces are parallelograms and may be reflective or transmissive.

In the following description, for purposes of explanation, numerous specific details are set forth in order to provide a thorough understanding of the present system and method for providing 360-degree image-projection using a single image projector. It will be apparent, however, to one skilled in the art, that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

Figure 1:
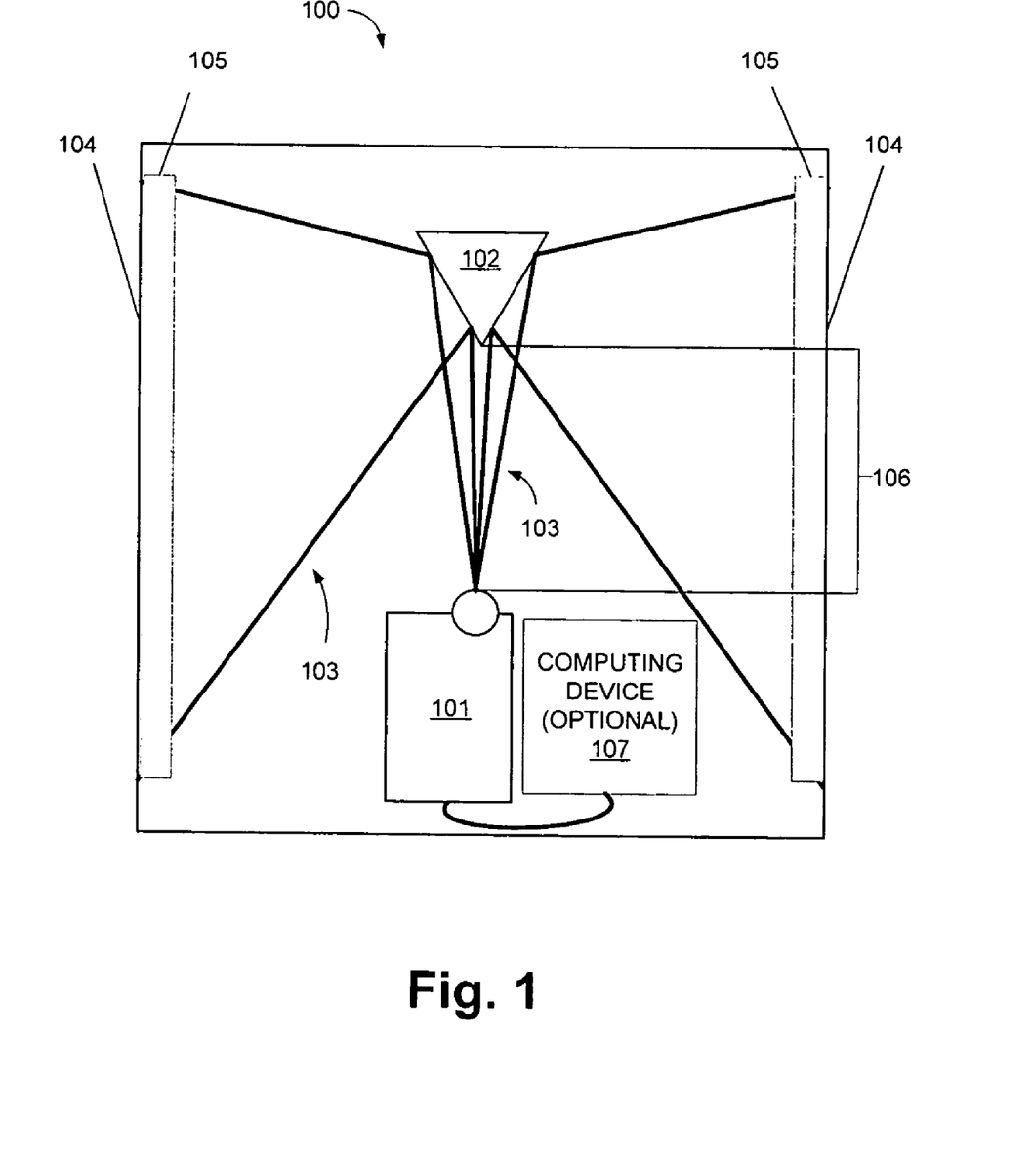
FIG. 1 is a block diagram of a projection system incorporating a prismatic mirror according to one exemplary embodiment.

FIG. 1 illustrates an exemplary projection system (100) capable of simultaneously projecting images onto multiple surfaces (104). As shown in FIG. 1, the exemplary projection system (100) includes a light (103) emitting image-projection device (101) optically coupled to a mirror (102) or other reflective surface. The mirror (102) or other reflective surface may also be optically coupled to a viewing surface (104) capable of displaying a projected image. A number of optically addressed displays (OAD) (105) may also be disposed between the mirror (102) and the viewing surface (104). Moreover, a computing device (107) may optionally be coupled to the image-projection device (101). The components and configuration of the exemplary projection system (100) illustrated in FIG. 1 will now be described in further detail below.

The image-projection device (101) illustrated in FIG. 1 is configured to selectively project and focus an image through the emission of light (103). The present image-projection device (101) may project and focus images using a conventional optics system known in the art. According to one exemplary embodiment, the image is projected using a lens (not shown) to focus light (103) created by a lamp or a bulb (not shown). The image-projection device (101) illustrated in FIG. 1 may be any image-projection device currently known including, but in no way limited to, a liquid crystal display (LCD) projector, a digital light projector (DLP), a liquid crystal on silicon (LCOS) projector, a cathode ray tube (CRT) projector, a film projector, a slide projector, an overhead projector, a light emitting diode (LED) projector, a vertical cavity emitting laser (VCEL) projector, and the like.

Figure 2:
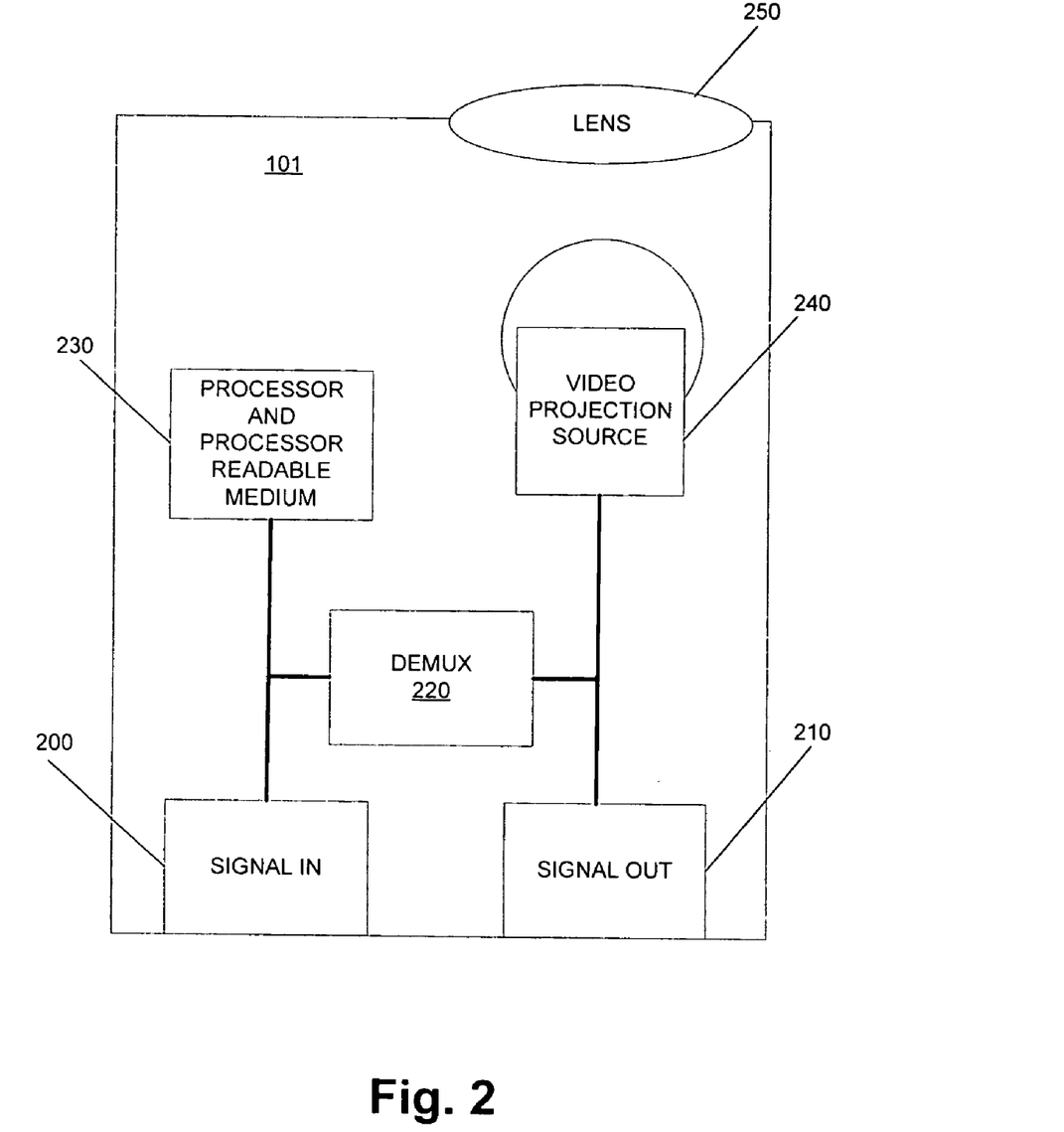
FIG. 2 is a block diagram of an image projector according to one exemplary embodiment.

FIG. 2 illustrates the components of an exemplary image-projection device (101) according to one exemplary embodiment. As shown in FIG. 2, the image-projection device (101) may include a signal-in (200) and a signal-out (210) port, a signal de-multiplexer (220), a signal processor (230), a video projection source (240), and at least one lens (250). The image-projection device (101) is configured to receive a media signal, including an image to be displayed, through the signal-in port (200). The signal-in port (200) may be any port configured to receive a media signal-including, but in no way limited to, a co-axial cable port, a serial port, a Radio Corporation of America (RCA) compatible port, a fiber optic cable port, a wireless port, and the like. The signal-in port (200) is communicatively coupled to both the signal de-multiplexer (220) and the signal processor (230). The signal de-multiplexer (220) is then communicatively coupled to the signal-out port (210) and the video projection source (240). This configuration allows a received signal to be processed by the signal processor (230), by accessing a processor readable medium contained therein, to determine signal-information while the video de-multiplexer (220) separates the incoming signal-into video, audio, and/or other components. A video component of a received signal may then be transmitted to the video projection source (240) for display while audio or any other media source may be transmitted by the signal-out port (210) and to communicatively coupled components (not shown). The video projection source (240) is in optical communication with the lens (250) in order to focus and/or otherwise manipulate the display of the video component. While the above-mentioned exemplary embodiment of an image-projection device (101) is described including a signal processor (230) and a signal de-multiplexer (220), the present system and method may be performed using any image-projection device including, but in no way limited to, a liquid crystal display (LCD) projector, a digital light projector (DLP), a liquid crystal on silicon (LCOS) projector, a cathode ray tube (CRT) projector, a film projector, a slide projector, an overhead projector, a light emitting diode (LED) projector, a vertical cavity emitting laser (VCEL) projector, and the like. Moreover, a computing device (107) may optionally be coupled to the image-projection device (101) to perform image manipulation on any received image signal. This image manipulation may be performed to match the incoming video signal to the mirror (102) being utilized by the present system and method.

Returning again to FIG. 1, the image-projection device (101) is disposed in optical communication with a mirror (102) or other reflective surface according to one exemplary embodiment. According to one embodiment, images are projected onto multiple surfaces by directing a first portion of the projected light (103) onto one surface of the mirror (102) or other reflective surface and subsequently directing a second portion of the light (103) to another surface of the mirror (102). The light reflects off the mirror (102), and onto a display surface (104) to portray the image. For the image to be displayed upright with an appropriate resolution and intensity, a few details should be considered. For example, the mirror (102) may be placed a specified optimal distance (106) away from both the projector (101) and the display surface (104). If the mirror (102) is too far from the projector (101), much of the projected light (103) will be projected around the mirror (102) and will lose intensity. If the mirror (102) is too close to the projector, not enough light will reflect to produce an image with acceptable size. The aforementioned examples also apply to mounting the mirror (102) too close or too far from the display surface (104) onto which the user is projecting an image.

In one exemplary embodiment, the image-projection device may be placed underneath the mirror, thus enabling the light projected by the projection device to reflect off the mirror onto the display surface (104, FIG. 1). The mirror (102) may include but is not limited to a triangular mirror, curved triangular mirror, pyramidal mirror, curved pyramidal mirror, semispherical mirror, or any other shape or design of mirror that could be used to project or reflect an image onto multiple surfaces. Additionally, the mirror (102) of the present exemplary projection system (100) may have externally reflective surfaces, or alternatively, the mirror (102) may be inverted, allowing a plurality of desired images to be projected into a cavity prior to being reflected and displayed. Advantages and characteristics of various mirror (102) shapes will be discussed in detail below with reference to FIG. 4 through FIG. 8B. As shown in FIG. 1, a mirror (102) having a triangular cross-section is used according to one exemplary embodiment.

From the mirror (102), the projected image is reflected onto a display surface (104). Image-projecting devices are capable of projecting an image onto various types of surfaces, some of which are better suited for viewing the image. Commonly used surfaces are usually flat such as a wall or a screen; however, curved and semispherical surfaces also lend themselves to particular image-projection applications. The present image-projection device (101) is optically coupled to the mirror (102) or other reflective surface such that light (103) emitted by the image-projection device (101) may be selectively reflected to and displayed on any number of the above mentioned viewing surfaces (104).

Additionally, the projected image may be displayed on a transmissive display surface (104). According to this exemplary embodiment, the mirror (102) or other reflective surface may reflect the projected image to and through the back of a transmissive surface. Once the image is transmitted through the surface, it may be viewed on the front side. According to this exemplary embodiment, the image projection device (101) and the mirror (102) may be disposed behind the transmissive display surfaces (104).

In some embodiments, an optically addressed display (OAD) (105) may be used to enhance the brightness of the projected image and/or retain the image for a specified amount of time. An OAD may be a passive or active device and may be suited for rear or front projection. The OAD may have pixel memory, which would retain a projected image for a predetermined amount of time. This has the positive effect of allowing the light (103) of a projected image to be directed in other directions while simultaneously maintaining the brightness of each projected image. OAD's may function in a variety of positions and may be disposed according to the specification of the user. FIG. 1 illustrates an OAD (105) disposed on a display surface (104). As shown, the OAD (105) may receive a projected image and retain and/or enhance the brightness of the projected image for a specified amount of time. The embodiment illustrated in FIG. 1 demonstrates a front projection embodiment of an OAD (105).

Exemplary Implementation and Operation

Presently, there are a number of methods that may be used to perform 360-degree image captures. According to one embodiment, the panoramas are collected by taking wide angle shots and stitching them together. According to other embodiments, images are morphed from a single capture. In yet a third embodiment, panoramas are collected by attaching a semi-spherical mirror to a camera attachment. According to this embodiment, the camera collects a 360-degree image which may then be morphed using vendor software into computer content that then allows one to view 360-degrees of images in a continuous strip of images. While traditional display methods for the above-mentioned 360-degree image captures include morphing and other image manipulation methods, the present system and method allow for the projection of 360-degree images without the inclusion of morphing and other manipulation methods.

Figure 3:
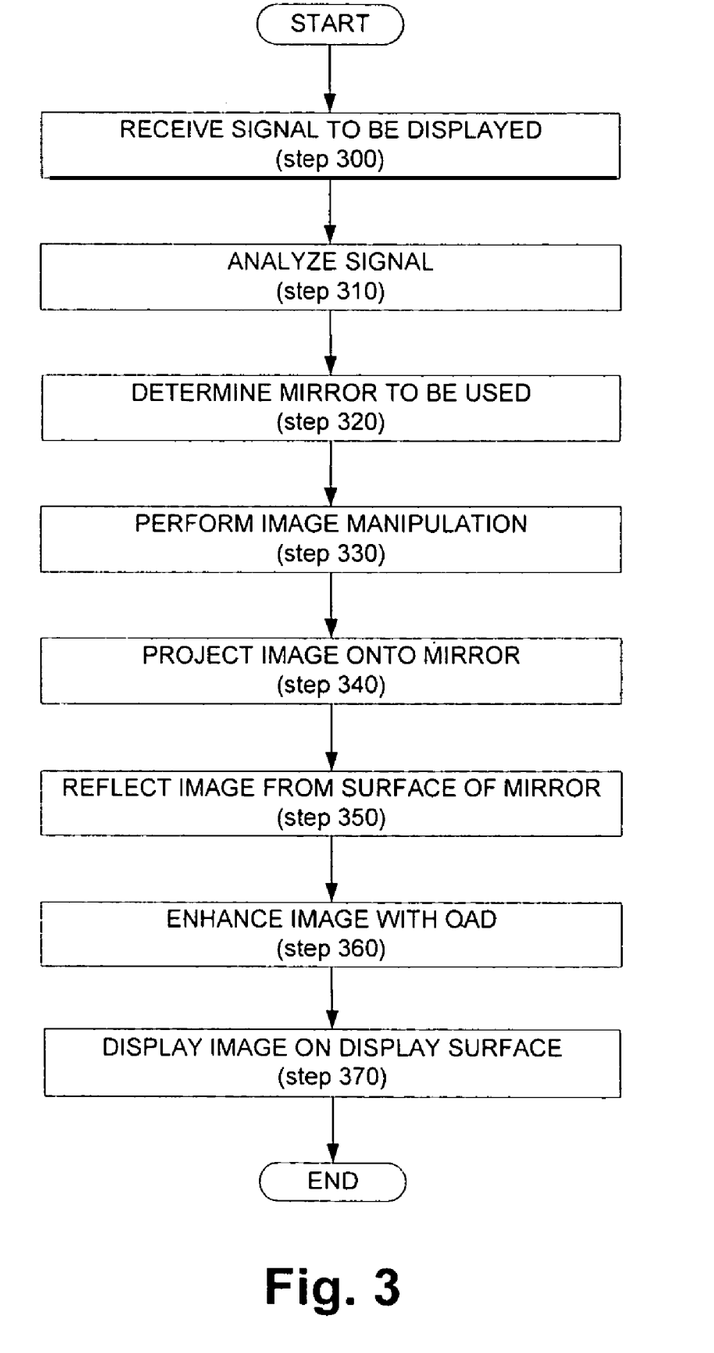
FIG. 3 is a flow chart illustrating a method for implementing a 360-degree projector according to one exemplary embodiment.

FIG. 3 illustrates an exemplary method for utilizing the system explained above to produce 360-degree image-projection. As shown in FIG. 3, the process may begin by receiving image data including a plurality of images to be displayed by the present system (step 300). Once the image data is received in the image-projection device (101), the signal may be analyzed (step 310) to determine the appropriate display method to be performed. During the analysis of the signal, the present projection system (100; FIG. 1) may optionally determine and provide the best mirror surface to be used to re-project the image data (step 320), or an image manipulation may be performed to match the image data with the mirror surface currently incorporated in the image-projection system (step 330). Once the signal has been analyzed, the image is projected onto a mirror or other reflective surface (step 340) and subsequently reflected by that mirror or reflective surface (step 350). Upon being reflected, the projected image may be enhanced with an optically addressed display (OAD) (step 360) and displayed on a display surface (step 370). Further details and explanations of the above-mentioned method will now be given below.

As shown in FIG. 3, the present method is implemented when the image-projection system (100; FIG. 1) receives a signal containing image data to be displayed (step 300). The received signal may be received through the signal-in port (200; FIG. 2) and may be received from any signal transmitting device including, but in no way limited to, a cable head-end transmitter, a digital satellite receiver, an intranet, the Internet, a cell phone, a personal computer, a laptop computer, etc. Moreover, the signal received by the present image-projection system (100; FIG. 1) may be either analog or digital.

Once the image data containing signal is received in the present image-projection system (step 300), the signal may optionally be analyzed (step 310). According to one exemplary embodiment, the image data containing signal-includes header information, a file extension, or a menu selection indicating the type of device used to collect the image containing data. Identifying the type of device used is significant to the present system and method because it allows the present system and method to closely reproduce the image-projection path and re-project the image back along the same optical paths using the same type of mirror or lens. According to this exemplary embodiment, if the same or similar image-projection path is used for the re-projection of the image, no morphing is needed. According to one exemplary embodiment, the device used to collect the image containing data is identified by the image projection system (step 310) through analyzing a number of Exchangeable Image File (EXIF) extensions associated with a JPEG (Joint Photographic Experts Group) image. According to this exemplary embodiment, EXIF extensions include a number of fields that provide a receiving device with information including a name and a number that identify the image input equipment used to collect the image. An identifier may be included in one field of the EXIF extensions to indicate to the receiving device the image-projection path used for the collection of the image. Once identified, the same or a similar image-projection path may be used for the projection of the image. Similar methods may be incorporated to identify the image projection path used for the collection of moving images.

As the signal is received and analyzed (step 310), a number of optional image manipulations may be performed by the image-projection device or a coupled computing device. According to one exemplary embodiment, upon analyzation of the received signal, a mirror or other reflective surface (102; FIG. 1) may be selected for use (step 320). According to this exemplary embodiment, the image display system includes a number of mirrors or other reflective surfaces from which to choose. Upon analysis of the received image containing signal, the mirror or other reflective surface that most closely matches the reflective surface used to collect the image containing signal may be identified and incorporated in the present image display system (100; FIG. 1). By incorporating a reflective surface that matches the reflective surface used to collect the image, the need for morphing is reduced or eliminated.

Figure 4:
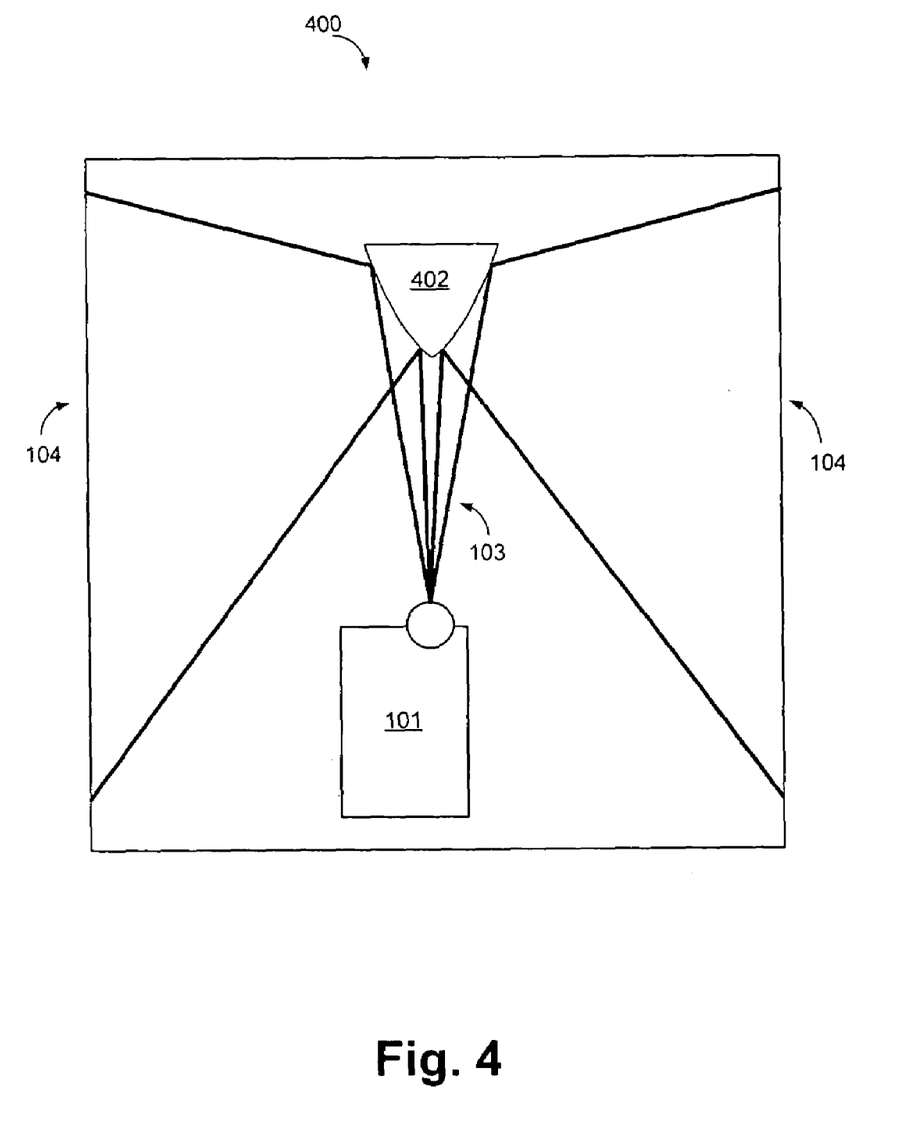
FIG. 4 is a block diagram of a projection system using a curved triangular mirror according to one exemplary embodiment.

FIGS. 4 through 7 illustrate a number of mirror or reflective shapes that may be incorporated by the present image-projection system (100; FIG. 1) in order to project an image on multiple viewing surfaces (104; FIG. 1). As shown in FIG. 4, a triangular mirror (402) that has two bulged or convex surfaces may be incorporated into an image display system (400). Such surfaces may be used to compensate for differences in source images, display surface (104) size and shape, etc. For example, if the image to be displayed was collected with a triangular (402) or similar mirror with convex surfaces, the image may be projected onto a flat display surface off of a triangular mirror with convex surfaces with minimal or no pre-morphing of the image. The convex surface of the mirror (402) would act similar to a wide-angle lens, spreading the projected image over a larger display surface (104), thereby accurately re-creating the image collected.

Figure 5A:
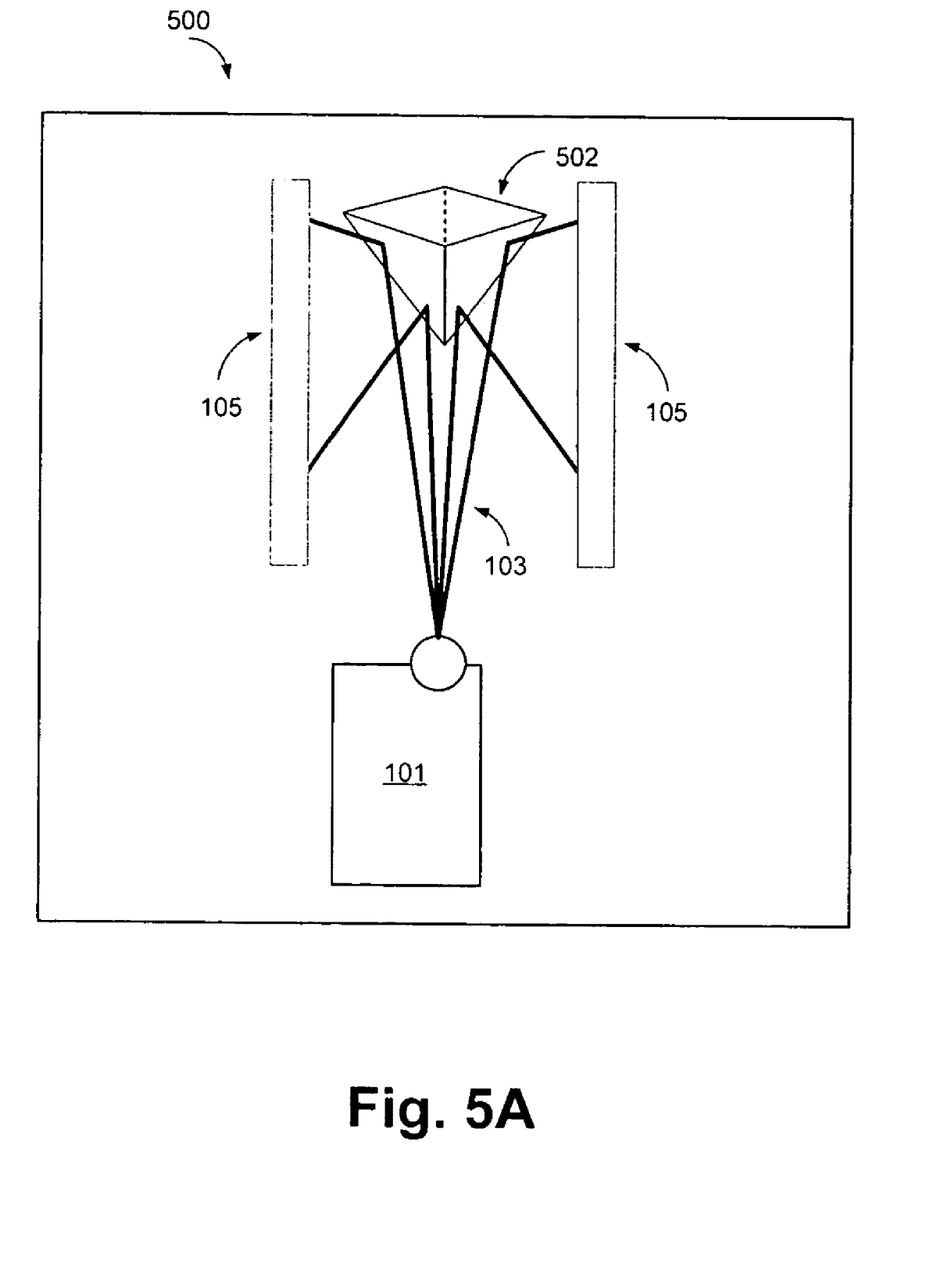
FIG. 5A is a block diagram of a projection system using a pyramidal mirror according to one exemplary embodiment.

FIG. 5A illustrates another alternative embodiment in which a pyramidal mirror (502) is used to reflect the images onto a plurality of OADs (105) serving as display surfaces (104; FIG. 4). The pyramidal mirror (502) enables image-projection by the image projection system (500) onto four different OADs (105). For example, a projection device (101) may project an image divided into four segments, each segment containing a separate, smaller image. When the focus, intensity, contrast and other settings are properly adjusted and configured, the projection device (101) may simultaneously project each smaller image onto one side of the pyramidal mirror (502). The separate smaller images are then projected from the pyramidal mirror (502) onto four OADs (105).

Figure 5B:
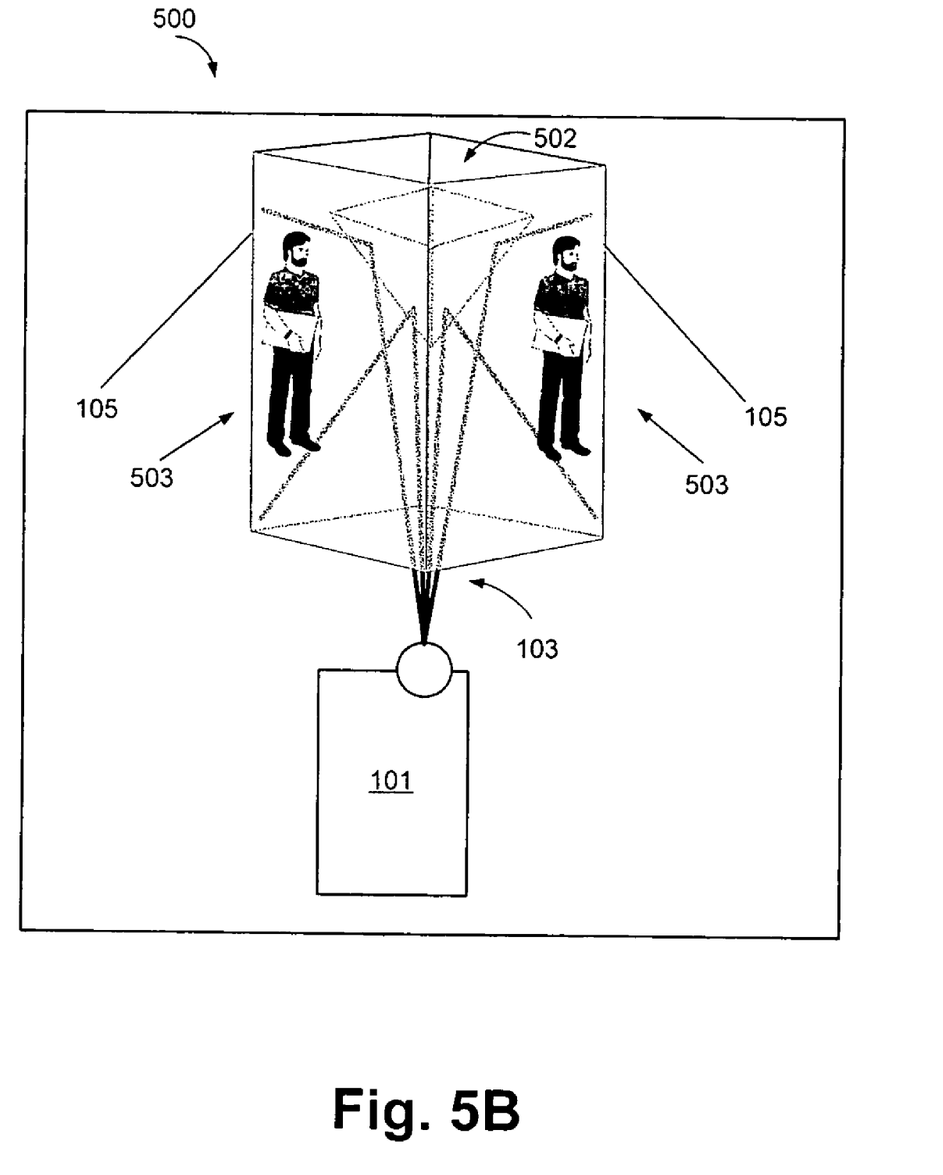
FIG. 5B is a block diagram illustrating a projection system using a pyramidal mirror and a rear projection OAD according to one exemplary embodiment.

FIG. 5B illustrates a projected image (503) being displayed by a number of rear projection OADs (105) serving as display surfaces. As is shown in FIG. 5B, the OADs (105) may be smaller than the room where the projected image (503) is being displayed. According to this exemplary embodiment, a viewer may walk around and view the projected image (503) simultaneously displayed on a plurality of rear projection OADs (105) serving as display surfaces.

Figure 6:
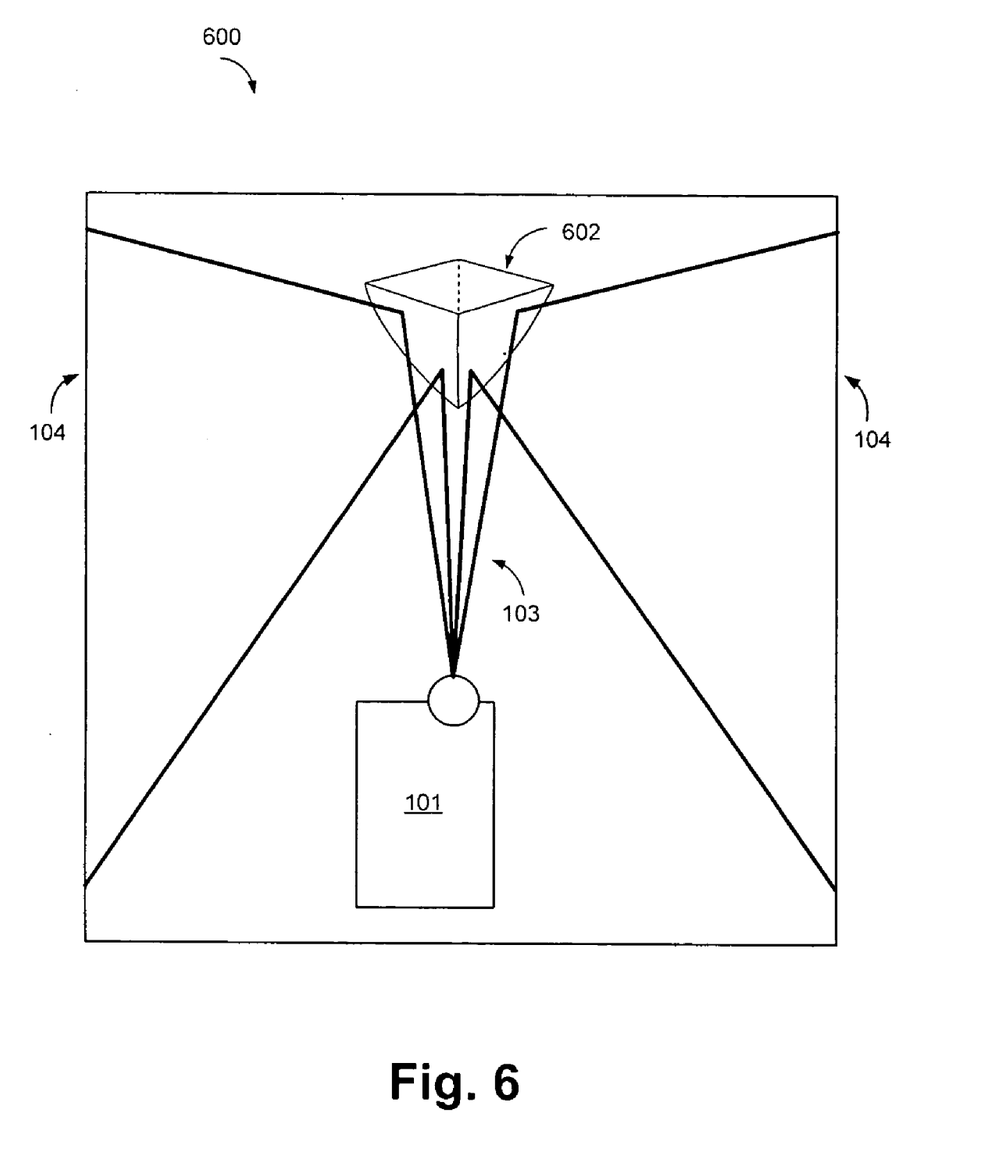
FIG. 6 is a block diagram of a projection system using a curved pyramidal mirror according to one exemplary embodiment.

FIG. 6 shows an exemplary embodiment of an image-projection system (600) that incorporates a pyramidal mirror having bulged or convex surfaces (602) to reflect images projected by the image-projection device (101). As was explained above with reference to FIG. 4, the convex reflective surfaces (602) allow an image that was captured using similar mirrors or reflective surfaces to be projected, reflected, and displayed upright and spatially correct, onto a display surface (104) without pre-morphing the image. According to the exemplary embodiment illustrated in FIG. 6, a projected image may be reflected by the pyramidal mirror having convex surfaces (602) onto a plurality of surfaces to form a contiguous 360-degree image.

Figure 7:
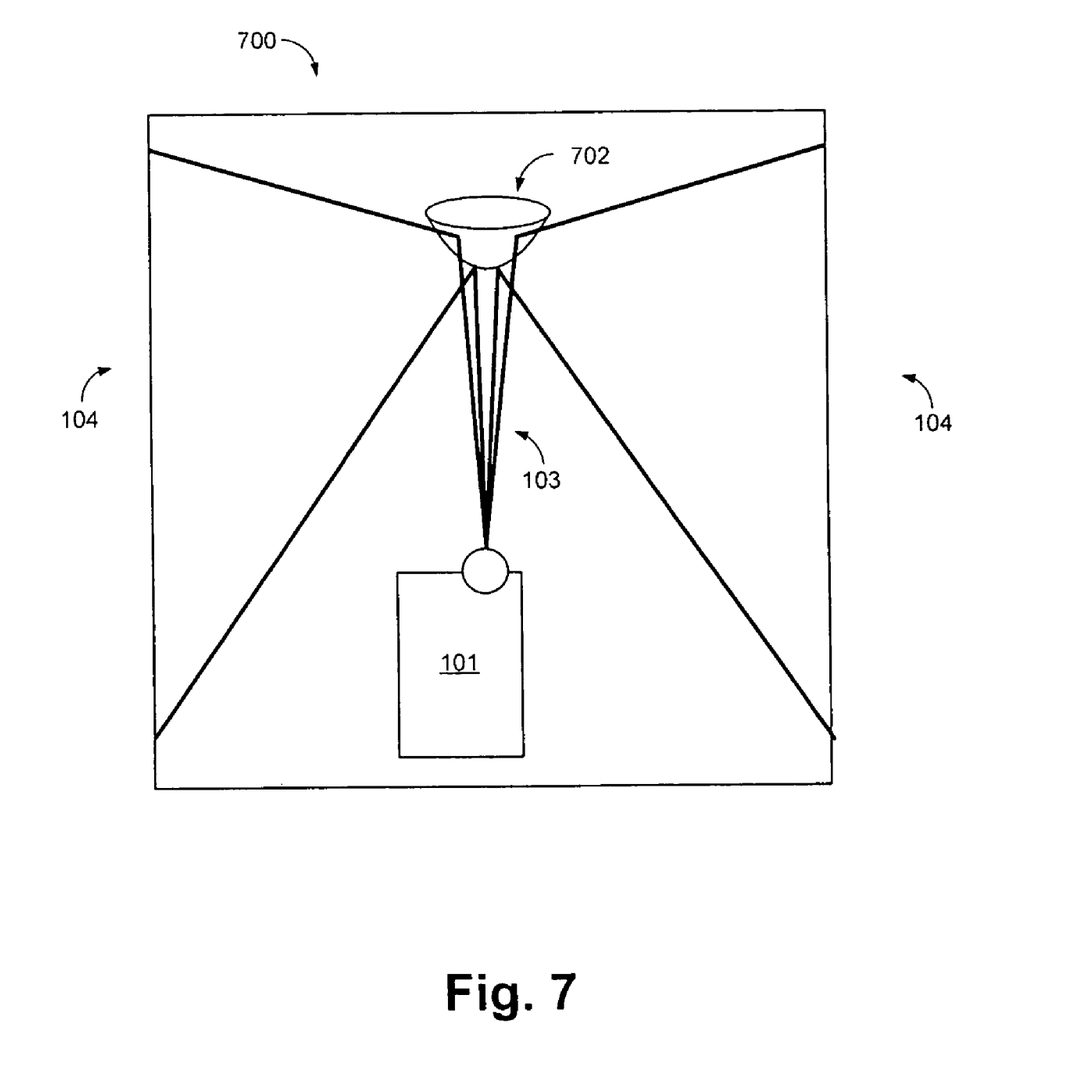
FIG. 7 is a block diagram of a projection and/or image capturing device according to one exemplary embodiment.

FIG. 7 illustrates yet another exemplary embodiment of an image-projection system (700) incorporating a semispherical mirror or reflective surface (702) configured to reflect a projected image being projected by an image-projection device (101). The semispherical surface (702) allows an image captured using similar mirrors or reflective surfaces to be projected and reflected, upright and spatially correct, onto a display surface (104) without pre-morphing the image. Such a mirror (702) may be advantageously used to project an image onto a spherical or semispherical display surface (104). As is illustrated in FIGS. 4 through 7, the mirror or reflective surface (702) implemented by the present system and method may assume any cross-sectional shape necessary to reproduce the image collection path used to collect the image being projected including, but in no way limited to, polygonal cross-sections or curved surfaces.

The present image-projection system, in contrast to traditional systems, does not require multiple projectors, or pre-morphing software. Any projector (101) with a proper focal length can project and reflect an image off of the mirror (702). Any image captured by taking an image from light reflected by a mirror (702) may thereafter be projected through the same path without pre-morphing. Also, the shape of the mirror (702) may be refined and customized to "fit" the displayed image to the room and correct for focusing incongruence.

Returning again to FIG. 3, the present image-projection system or a communicatively coupled computing device (107; FIG. 1) may perform an optional image manipulation process according to one exemplary embodiment. An image-projection system (100; FIG. 1) may be unable to access a mirror or reflective surface (102; FIG. 1) that directly correlates with the reflective surface used to collect the image containing data. In this instance, the image-projection system (100; FIG. 1) may optionally perform a pre-morphing process to correlate the image data with the mirror presently being incorporated into the image-projection system (100; FIG. 1). According to one exemplary embodiment, the image-projection system (100; FIG. 1) may be equipped with a single mirror (102; FIG. 1). According to this exemplary embodiment, the mirror may be selected to correspond with the mirror most often used in the collection of image data. This will maximize the instances where pre-morphing is not required and minimize the instances where the image data will need to be morphed to correlate with the mirror (102; FIG. 1) incorporated in the image-projection system and the display surfaces (104; FIG. 1) receiving the projected images.

As noted above, resolution, contrast, spacing, and other problems may be solved using image pre-morphing techniques. Each image may be warped, skewed, highlighted, darkened, stretched, compressed, or otherwise modified to allow for correct visual display on the display surface (104; FIG. 1) after reflection off a mirror (102; FIG. 1). In some cases, the surfaces (104; FIG. 1) on which the image will be displayed may not be equivalent to each other. Images may be altered or modified so as to fill each display surface, or a defined portion thereof, with the projected image. The images, lenses, mirrors, distances between the projector and the mirror and between the mirror and the display surface, projector luminosity, etc. are all customizable and may be tailored to fit the walls in a room or other type of display surface.

According to one exemplary embodiment, the received analyzed signal may be manipulated to match the targeted display surface (104; FIG. 1). The received signal may be manipulated to the correct size and distance (zoom) corresponding to the display surface (104; FIG. 1). The ability to manipulate the received and analyzed signal to match the desired display surface (104; FIG. 1) allows the present system and method to operate in a room that might not be square and/or where a distance to each display surface (104; FIG. 1) might be different. In contrast or in conjunction with signal manipulation, the mirror (102) or other reflective surface may be adjusted to compensate for varying display surfaces (104; FIG. 1). According to one exemplary embodiment, the top of the mirror (102; FIG. 1) would be at the correct angle to hit the top of the facing wall. With this configuration, the bottom of the mirror (102; FIG. 1) or other reflective surface may be selectively masked to accommodate the size of the display surface (104; FIG. 1). With the bottom of the mirror (102, FIG. 1) masked, the image may be dynamically resized. According to one exemplary embodiment, the bottom marker in an image file may be moved up until it reaches the bottom of a wall or other display surface (104; FIG. 1). Once that position is found, software may be used to recalibrate the image. This scaling information would then be used to modify new images being projected through the system and future images would be calibrated to the room setup.

Once the signal containing image data has been analyzed (step 310) and optionally manipulated (step 330), the image-projection device (101; FIG. 1) may project the image onto the mirror (step 340). Projection of the image on to the mirror (102; FIG. 1) or other reflective object may be performed according to a number of embodiments explained below.

According to one exemplary embodiment, the source of the projected image, whether electronic, film, or otherwise, may be divided up into two or more sections per displayed frame, having distinct images in each frame. According to this exemplary embodiment, when one frame is projected onto a mirror (102; FIG. 1), each section corresponds to a surface of the mirror and is reflected accordingly.

Figure 8A:
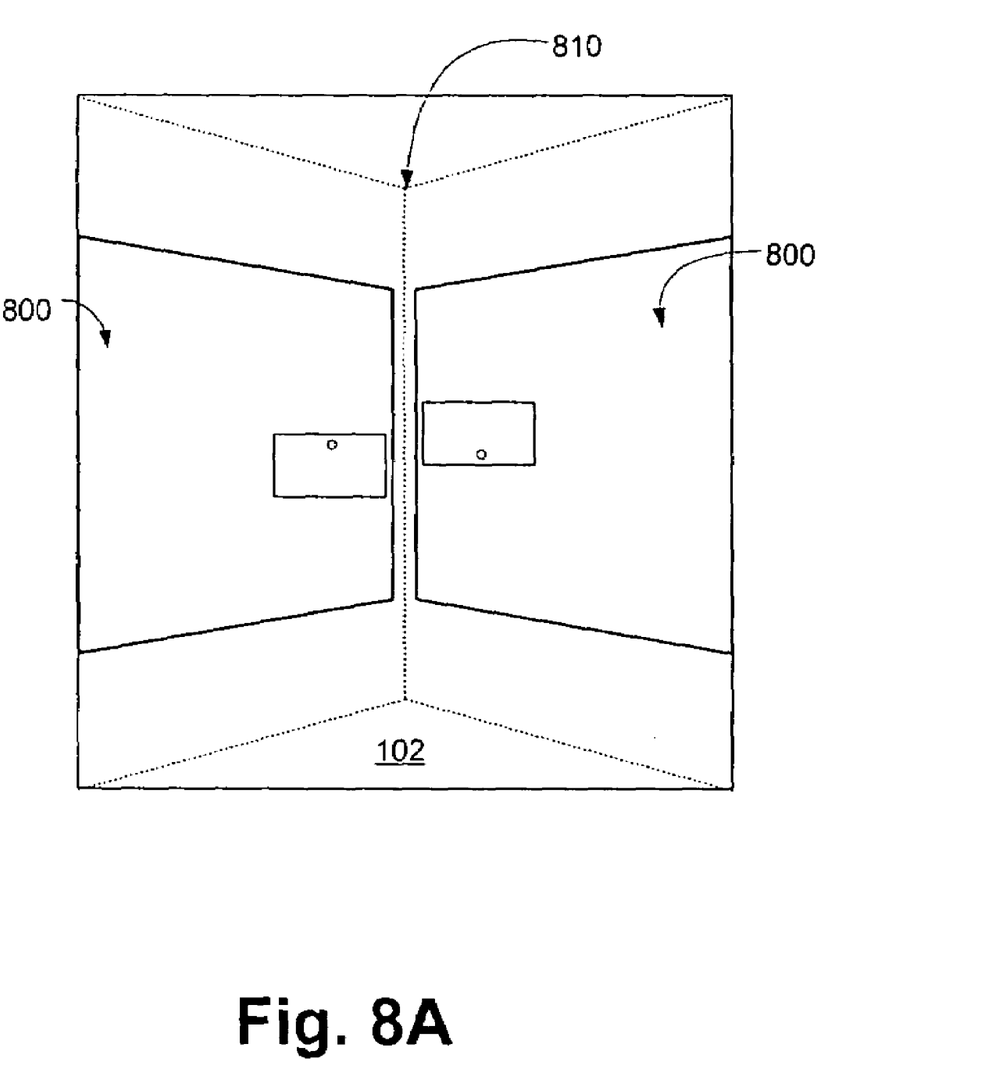
FIG. 8A is a block diagram of two image frames projected onto a prismatic mirror according to one exemplary embodiment.
Figure 8B:
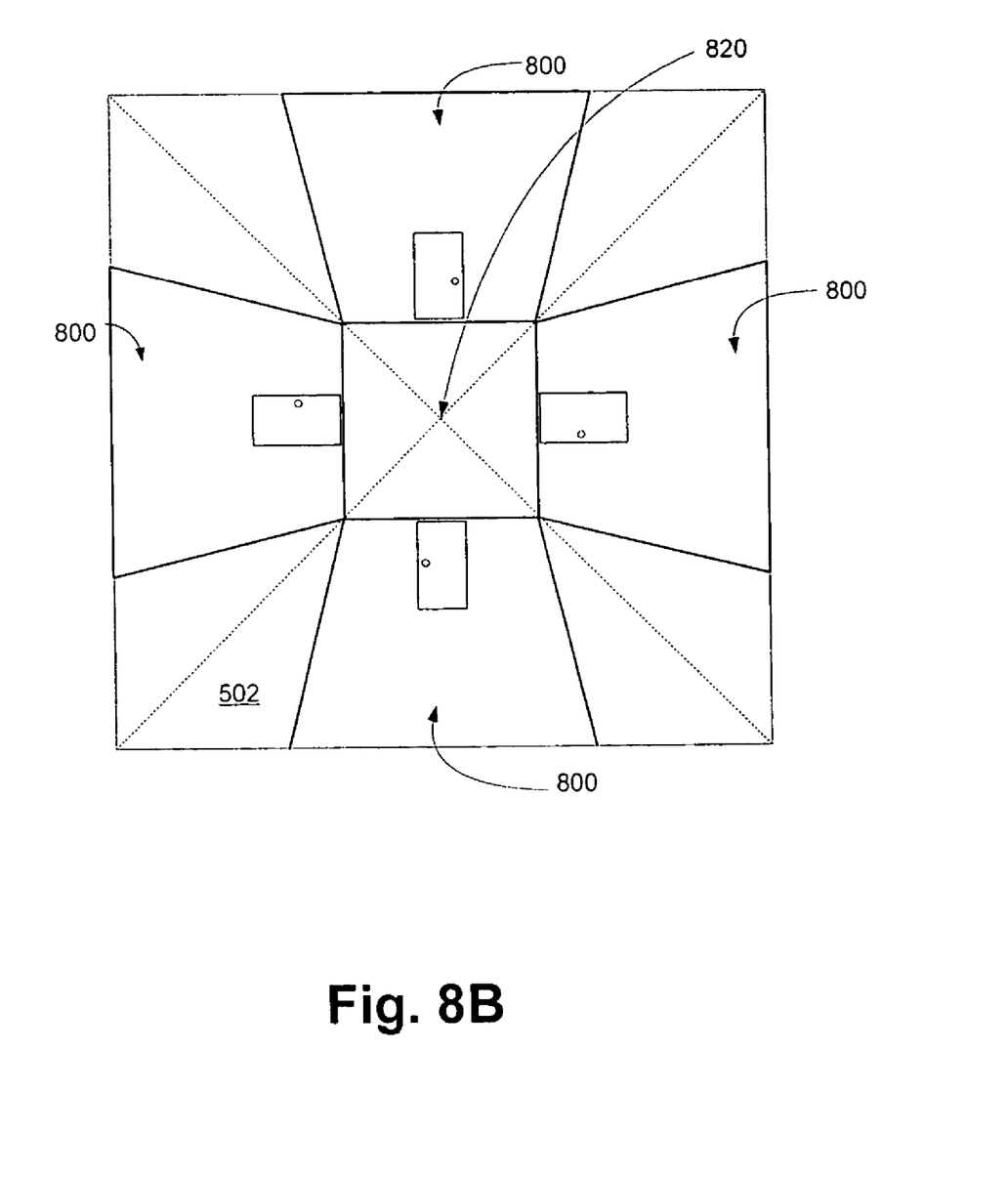
FIG. 8B is a block diagram of four image frames projected onto a pyramidal mirror according to one exemplary embodiment.

FIG. 8A and FIG. 8B illustrate a projected image including sections being reflected off of a prismatic and a pyramidal mirror respectively. As shown in FIG. 8A, when an image is to be reflected off of a prismatic mirror (102), two sections (800) are projected. The interface (810) between the two sections (800) of the projected image is disposed on the apex of the prismatic mirror (102) as shown in FIG. 8A. According to this exemplary embodiment, each section is accurately reflected off of a single reflective surface of the prismatic mirror (102) and onto a viewing surface (104; FIG. 1). Similarly, FIG. 8B illustrates a sectioned image being reflected off of the surfaces of a pyramidal mirror (502). As shown in FIG. 8B, a pyramidal mirror facilitates an image that includes four sections (800). According to this embodiment, the apex of the four sections is coordinated with the apex of the pyramidal mirror (502) providing that each section of the projected image will be independently reflected from a single surface of the pyramidal mirror (502). This exemplary method for projecting an image onto the mirror (102; FIG. 1) only requires the sectioning of the projected image. Consequently, any image-projection device listed above may be incorporated to project the sectioned image.

In an alternative embodiment, a projection device (101; FIG. 1) may project separate images on multiple surface of a mirror (102; FIG. 1) or other reflective surface by implementing a method of "time sharing." According to this exemplary embodiment, for a series of pictures to appear optically simultaneous, without optically noticeable breaks such as in TV or a movie, a new image or "frame" is typically projected onto a surface of the mirror and subsequently displayed 24 times per second for movies or 30 times per second for television. Below this range, the average human eye is able to detect a flicker and will begin to see the individual frames. According to one exemplary embodiment, an image-projection device (101; FIG. 1) using time sharing can project one image onto one half of a prismatic mirror for a short fraction of time (e.g. at 30 frames per second (fps), the fraction of time might be 1/60 of a second). At the finish of the time segment, the projector (101) would then project another image for 1/60 of a second onto the other surface of the prismatic mirror (102). This process would repeat itself, allowing for TV, movies, real-time video feed, or other motion picture sequences to be displayed on two opposing surfaces fast enough to appear seamless to the human eye. Two still images may be displayed in the same manner. Similarly, in order to implement the time sharing method explained above on a pyramidal mirror, the frame projection time will be 1/120 of a second for each image as it is projected on each surface of the pyramidal mirror.

In order to accomplish the "time sharing" produced by the projection of an image at various surfaces of a mirror or other reflective device for short periods of time, light from an image-projection device (101; FIG. 1) may be directed with precision using a digital light processor (DLP). A DLP chip, sometimes referred to as a digital micromirror device (DMD), contains a plurality of micro-mirrors each of which can be independently electronically controlled. The micromirrors, depending on the type of DLP chip used, may have any number of positions, as will be familiar to one skilled in the art. The image-projection device may use such a chip to momentarily direct all the projected light representing an image in one direction, for example, to the left side of a prismatic mirror (102; FIG. 1) so as to project the image on a surface to that side of the mirror. DLP chips are capable of changing the state of each micromirror thousands of times each second. Using this feature, light from the image-projection device could potentially be directed from one side of a prismatic mirror (102; FIG. 1) to the other in succession, quick enough to allow two separate full resolution images to be displayed onto a plurality of different surfaces.

Once the image is projected onto the mirror (step 340), the projected image is reflected from the surface of the mirror or other reflective surface (step 350) towards a display surface (104; FIG. 1). The angle that the image is reflected, and consequently, the location of the reflected image on the display surface (104; FIG. 1) may be varied depending on the mirror (102; FIG. 1) or other reflective surface used.

To enhance the brightness of the image on the display surface (104; FIG. 1), an Optically Addressed Display or OAD (105; FIG. 1) may be incorporated into the present system and method (step 360). An OAD may be a passive or active device and may be suited for rear or front projection (rear projection is illustrated in FIGS. 1 & 3). The OAD may have pixel memory which would retain the projected image for a predetermined amount of time. By retaining the projected image for a pre-determined amount of time and enhancing the brightness of the image, an optically seamless image may be produced while projecting a number of images onto multiple display surfaces (104; FIG. 1). OAD's (105) may be implemented to enhance the brightness of the projected image by systematically adding luminosity to each part of the image (pixel by pixel in a digital system). OAD's may function in a variety of positions and may be disposed according to the specification of the user.

Upon reflecting the image from the surface of the mirror (102; FIG. 1) and optionally enhancing the brightness and duration of the image with an OAD, the image is displayed on either the front or back side of the OAD device depending on the type of device used (step 370). The OAD typically acts as a transmissive display surface by displaying the image on itself.

In some embodiments, the image-projection system may be used in a room with four walls, a ceiling, and a floor. According to one exemplary embodiment, the four walls may serve as the display surfaces (104; FIG. 5). According to this embodiment, the mirror is installed, mounted, or positioned above the projection device (101; FIG. 5) in the middle of the room, equidistant from each of the four walls. The optics of the mirror (502; FIG. 5) (shape, size, position, etc.) are also designed to enable the projection device (101; FIG. 5) to display an image over the entire surface of a wall (104; FIG. 5). Accordingly, four images may be projected and displayed on each of the four walls in a room using the single projection device (101; FIG. 5). Moreover, by correlating the shape of the mirror (502; FIG. 5) with the reflective surface used to collect the image being displayed, image morphing is not necessary. Once projected, the images may comprise one contiguous 360-degree image thereby providing a completely immersive environment for a user. Additionally, audio signal may be introduced to provide a user with both an optically and audible immersive environment.

In conclusion, the present image-projection system, in its various embodiments, is capable of projecting multiple individual images onto multiple surfaces simultaneously using a single projector. In doing such, the present system and method is capable of providing an immersive environment for a user. By using a single projector, color and intensity matching, tiling, and other concerns associated with using multiple projectors, are diminished. Additionally, by allowing the user to capture and project an image along the same path that the image was collected, no image pre-morphing is necessary.

The preceding description has been presented only to illustrate and describe embodiments of the present method and system. It is not intended to be exhaustive or to limit the disclosure to any precise form disclosed. Many modifications and variations are possible in light of the above teaching. It is intended that the scope of the invention be defined by the following claims.

What is claimed is:

1. A display system configured to receive data bearing collected images, wherein said collected images were collected using a first optical path including a first reflective surface, said display system comprising:
   an image-projection device; and
   a second optical path including a second reflective surface optically coupled to said image-projection device;
   wherein said second reflective surface is configured to reflect a plurality of images projected by said image-projection device onto a plurality of display surfaces;
   wherein said second optical path has the same optical properties as said first optical path such that said display system projects said plurality of images along an optical path matching said first optical path used during collection of said plurality of images.

2. The display system of claim 1, wherein said plurality of images are displayed on four walls.

3. The display system of claim 2, wherein said plurality of images are contiguous in 360-degrees.

4. The display system of claim 1, wherein said reflective surface comprises a mirror, said mirror being substantially similar to a reflective surface used in a capture of said plurality of images.

5. The display system of claim 4, wherein said reflective surface comprises a polygonal shaped cross-section.

6. The display system of claim 5, wherein said reflective surface comprises one of a pyramidal mirror or a prismatic mirror.

7. The display system of claim 4, wherein said reflective surface comprises a rounded surface.

8. The display system of claim 7, wherein said reflective surface comprises one of a sphere or a hemisphere.

9. The display system of claim 1, wherein said image-projection device comprises one of a liquid crystal display (LCD) projector, a digital light projector (DLP), a liquid crystal on silicon (LCOS) projector, a cathode ray tube (CRT) projector, a film projector, a slide projector, an overhead projector, a light emitting diode (LED) projector, or a vertical cavity emitting laser (VCEL) projector.

10. The display system of claim 9, wherein said display system further comprises a computing device communicatively coupled to said image-projection device.

11. The display system of claim 10, wherein said computing device is configured to pre-morph said plurality of images.

12. The display system of claim 10, wherein said display system further comprises a plurality of selectable reflective surfaces.

13. The display system of claim 12, wherein said computing device is configured to analyze an image data stream and select one of said selectable reflective surfaces;
   wherein said selected reflective surface is configured to project said plurality of images along a same path as was used for a collection of said images.

14. The display system of claim 1, wherein said image-projection device comprises:
   a data input;
   a data processing device communicatively coupled to said data input; and
   an image-projection component coupled to said processing device;
   wherein said data processing device is configured to analyze said plurality of images and select a reflective surface to project said plurality of images along a same path as was used for a collection of said images based on said analysis.

15. The display system of claim 1, wherein said display surface comprises an optically addressed display (OAD) in optical communication with said reflective surface;
   wherein said OAD is configured to enhance a brightness of said plurality of images after projection by said image-projection device.

16. The display system of claim 15, wherein said OAD comprises a rear projection OAD.

17. The display system of claim 15, wherein said OAD comprises a front projection OAD.

18. The display system of claim 1, further comprising a digital light processor (DLP) configured to selectively control the projection of said plurality of images onto areas of said reflective surface.

19. The display system of claim 18, wherein said DLP is configured to allow time sharing to occur in said display system.

20. The display system of claim 1, wherein:
   said image projection device is configured to project a plurality of images;
   said images being sectioned to correspond with said reflective surface.

21. The display system of claim 20, wherein said display surfaces comprise rear projection OADs, said rear projection OADs being configured to display said plurality of images to a viewer located external to said OADs.

22. The display system of claim 1, wherein said system is configured to adjust said reflective surface to correspond to a room dimension.

23. The display system of claim 1, wherein said reflective surface is triangular.

24. A display system configured to receive data bearing collected images, wherein said collected images were collected using a first optical path including a first reflective surface, said display system comprising:
   an image-projection device; and
   a second optical path including a second reflective surface optically coupled to said image-projection device;
   wherein said second reflective surface is configured to reflect a plurality of images projected by said image-projection device onto a plurality of display surfaces;
   wherein said second optical path corresponds to said first optical path such that said plurality of images comprise non-morphed images.

25. A display system configured to receive data bearing collected images, wherein said collected images were collected using a first optical path including a first reflective surface, said display system comprising:
a single means for projecting an image; and
a second optical path including means for reflecting an image, said means for reflecting optically coupled to said image-projection means;
wherein said means for reflecting is configured to reflect a plurality of images projected by said image-projection means onto a plurality of display surfaces;
wherein said second optical path has the same optical properties as said first optical path such that said display system projects said plurality of images along an optical path matching said first optical path used during collection of said plurality of images.

26. The display system of claim 25, wherein said plurality of images are displayed on four walls.

27. The display system of claim 26, wherein said plurality of images are contiguous in 360-degrees.

28. The display system of claim 25, further comprising means for computing, wherein said means for computing is communicatively coupled to said image-projection means.

29. The display system of claim 28, wherein said means for computing is configured to pre-morph said plurality of images.

30. The display system of claim 29, further comprising a plurality of selectable means for reflecting.

31. The display system of claim 30, wherein said means for computing is configured to analyze an image data stream and select one of said selectable means for reflecting;
wherein said means for reflecting is configured to project said plurality of images along a same path as was used for a collection of said images.

32. The display system of claim 25, further comprising means for enhancing said plurality of images.

33. The display system of claim 32, wherein said means for enhancing said plurality of images is configured to enhance a brightness of said plurality of images after projection by said image-projection means.

34. The display system of claim 25, further comprising means for time sharing a projection of said plurality of images.

35. The display system of claim 25, wherein:
said image projection means is configured to project a plurality of images;
said images being sectioned to correspond with said means for reflecting.

36. The display system of claim 25, wherein said means for reflecting an image comprise a triangular mirror.

37. A display system comprising:
a single means for projecting an image; and
a means for reflecting an image, said means for reflecting optically coupled to said image-projection means;
wherein said means for reflecting is configured to reflect a plurality of images projected by said image-projection means onto a plurality of display surfaces;
wherein said plurality of images comprise non-morphed images.

38. A method for projecting an image onto multiple display surfaces comprising:
projecting said image from a single image projection device onto a reflective surface;
wherein said reflective surface is configured to reflect said image onto said multiple display surfaces in an optically simultaneous fashion along a second optical path corresponding to a first optical path used to collect said image originally.

39. The method of claim 38, further comprising projecting multiple images onto said multiple display surfaces using said single image-projection device.

40. The method of claim 39, wherein said multiple images comprise a 360-degree image.

41. The method of claim 40, further comprising displaying said 360-degree image on four contiguous surfaces.

42. The method of claim 38, wherein said image comprises a plurality of segments, wherein each of said segments comprises a separate image to be displayed on one of said multiple display surfaces.

43. The method of claim 42, further comprising projecting said plurality of segments onto said reflective surface such that each of said plurality of segments corresponds to a portion of said reflective surface.

44. The method of claim 38, wherein said image is both collected and projected without pre-morphing said image.

45. The method of claim 38, further comprising optically coupling an optically addressed display with said reflective surface, wherein said optically addressed display is configured to enhance said image.

46. The method of claim 38, further comprising time sharing a projection of said image onto a plurality of display surfaces by projecting said image to a first portion of said reflective surface for a period of time and subsequently directing another image to a second portion of said reflective surface for a period of time.

47. The method of claim 46, wherein said time sharing is performed at an optically simultaneous rate.

48. The method of claim 46, wherein said time sharing is performed using a digital light processing chip.

49. The method of claim 38, wherein said reflective surface comprises a polygonal shaped cross-section.

50. The method of claim 49, wherein said reflective surface comprises one of a pyramidal mirror or a prismatic mirror.

51. The method of claim 38, wherein said reflective surface comprises a rounded surface.

52. The method of claim 51, wherein said reflective surface comprises one of a sphere or a hemisphere.

53. The method of claim 38, wherein said reflective surface is triangular.

54. A display system comprising:
an image-projection device; and
a reflective surface optically coupled to said image-projection device;
wherein said reflective surface is configured to reflect a plurality of images projected by said image-projection device onto a plurality of display surfaces;
wherein said reflective surface is triangular; and
wherein said triangular reflective surface has convex sides.

55. A display system comprising:
an image-projection device; and
a reflective surface optically coupled to said image-projection device;
wherein said reflective surface is configured to reflect a plurality of images projected by said image-projection device onto a plurality of display surfaces;
wherein said reflective surface is a curved triangular mirror.

56. A display system comprising;
a single means for projecting an image; and
a means for reflecting an image, said means for reflecting optically coupled to said image-projection means;
wherein said means for reflecting is configured to reflect a plurality of images projected by said image-projection means onto a plurality of display surfaces;
said projection being along a same optical path as a collection of said plurality of images;
wherein said means for reflecting an image comprise a triangular mirror; and
wherein said triangular mirror has convex sides.

57. A display system comprising:
a single means for projecting an image; and
a means for reflecting an image, said means for reflecting optically coupled to said image-projection means;
wherein said means for reflecting is configured to reflect a plurality of images projected by said image-projection means onto a plurality of display surfaces;
said projection being along a same optical path as a collection of said plurality of images;
wherein said means for reflecting an image comprise a triangular mirror; and
wherein said means for reflecting an image comprise a curved triangular mirror.

58. A method for projecting an image onto multiple display surfaces comprising:
projecting said image from a single image projection device onto a triangular reflective surface;
wherein said triangular reflective surface is configured to reflect said image onto said multiple display surfaces in an optically simultaneous fashion; and
wherein said triangular reflective surface has convex sides.

59. A method for projecting an image onto multiple display surfaces comprising;
projecting said image from a single image projection device onto a reflective surface;
wherein said reflective surface is configured to reflect said image onto said multiple display surfaces in an optically simultaneous fashion;
wherein said reflective surface is a curved triangular mirror.

60. A method for projecting an image onto multiple display surfaces comprising:
projecting said image from a single image projection device onto a reflective surface;
matching said reflective surface with equipment used to capture said image originally such that said reflective surface is configured to reflect said image onto said multiple display surfaces in an optically simultaneous fashion along an optical path corresponding to an optical path used to capture said image originally.

* * * * *